(12) United States Patent
Suzuki et al.

(10) Patent No.: US 6,360,008 B1
(45) Date of Patent: Mar. 19, 2002

(54) METHOD OF AND APPARATUS FOR CONVERTING COLOR DATA

(75) Inventors: Shoji Suzuki; Masahiro Mori, both of Kawasaki; Keiji Uchikawa, Kamakura, all of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/182,565

(22) Filed: Oct. 29, 1998

(30) Foreign Application Priority Data

Mar. 25, 1998 (JP) .......................................... 10-076903

(51) Int. Cl.$^7$ ................................................ G06K 9/00
(52) U.S. Cl. ......................................... 382/167; 358/518
(58) Field of Search ................................ 382/162, 167, 382/165, 163, 164, 166; 358/1.9, 518, 523, 504, 519, 520, 521, 522

(56) References Cited

U.S. PATENT DOCUMENTS

| | | |
|---|---|---|
| 4,758,885 A | 7/1988 | Sasaki et al. .................. 358/80 |
| 5,239,370 A | 8/1993 | Yamaguchi .................. 358/518 |
| 5,276,779 A | 1/1994 | Statt ........................... 395/109 |
| 5,594,558 A | 1/1997 | Usami et al. ................ 358/518 |
| 5,664,072 A * | 9/1997 | Ueda et al. ................... 358/1.9 |
| 5,742,520 A * | 4/1998 | Uchikawa et al. .......... 358/518 |
| 5,761,070 A * | 6/1998 | Conners et al. ............. 700/223 |
| 6,047,085 A * | 4/2000 | Sato et al. ................... 382/165 |

FOREIGN PATENT DOCUMENTS

| | | |
|---|---|---|
| EP | 0 574 905 | 12/1993 |
| EP | 0 706 285 | 4/1996 |
| JP | 8-123958 | 5/1996 |

OTHER PUBLICATIONS

Copy of European Patent Office Communication for European Patent Application No. 98120491, including European Search Report dated Feb. 27, 2001.

\* cited by examiner

*Primary Examiner*—Bhavesh Mehta
*Assistant Examiner*—Ali Bayat
(74) *Attorney, Agent, or Firm*—Armstrong, Westerman & Hattori, LLP

(57) ABSTRACT

Color data for a color image device having a first color range (gamut) are converted into color data for a color image device having a second color range (gamut). For preventing colors from being altered when color data are converted, first color data in the first color range (gamut) of the first image device is converted into corresponding colors by referring to a classification table representing the correspondence between colors determined based on human color perception and the first color data, and then the first color data is converted into second color data in the second color range (gamut) of the second image device with respect to each of the classified colors. Since each of the colors based on the human color perception is converted, colors are prevented from being altered due to the conversion. Because each of the colors of a color image is converted, the clearness of the color image will not be lost.

19 Claims, 19 Drawing Sheets

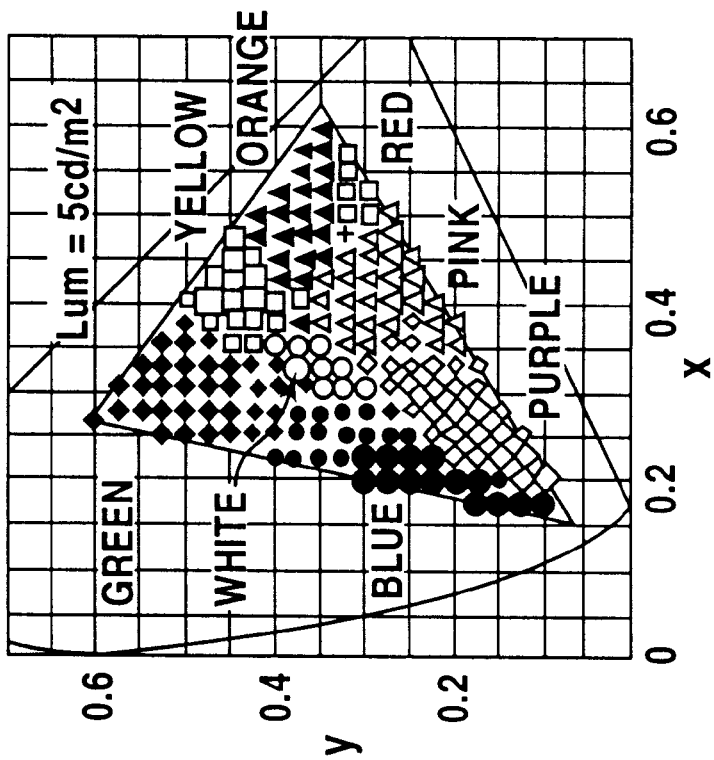
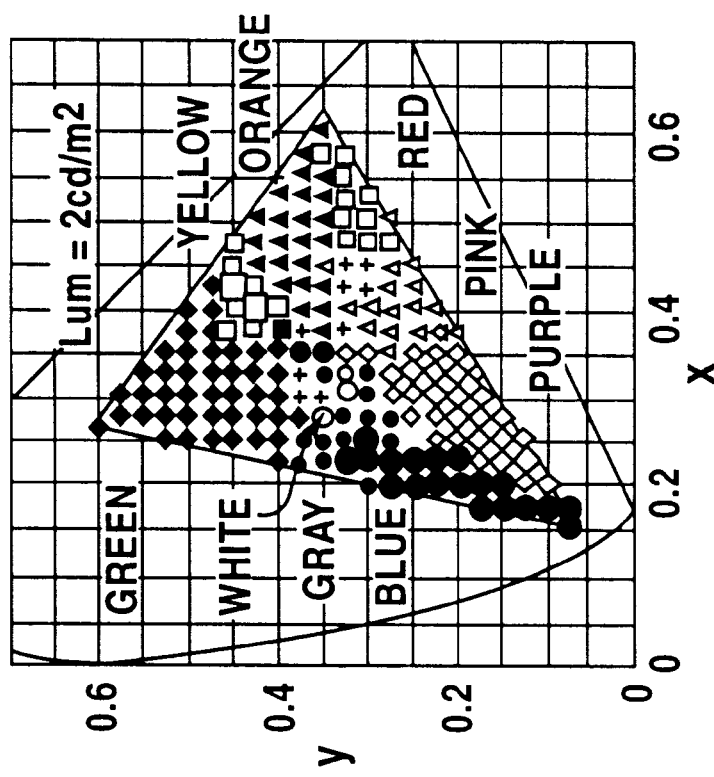

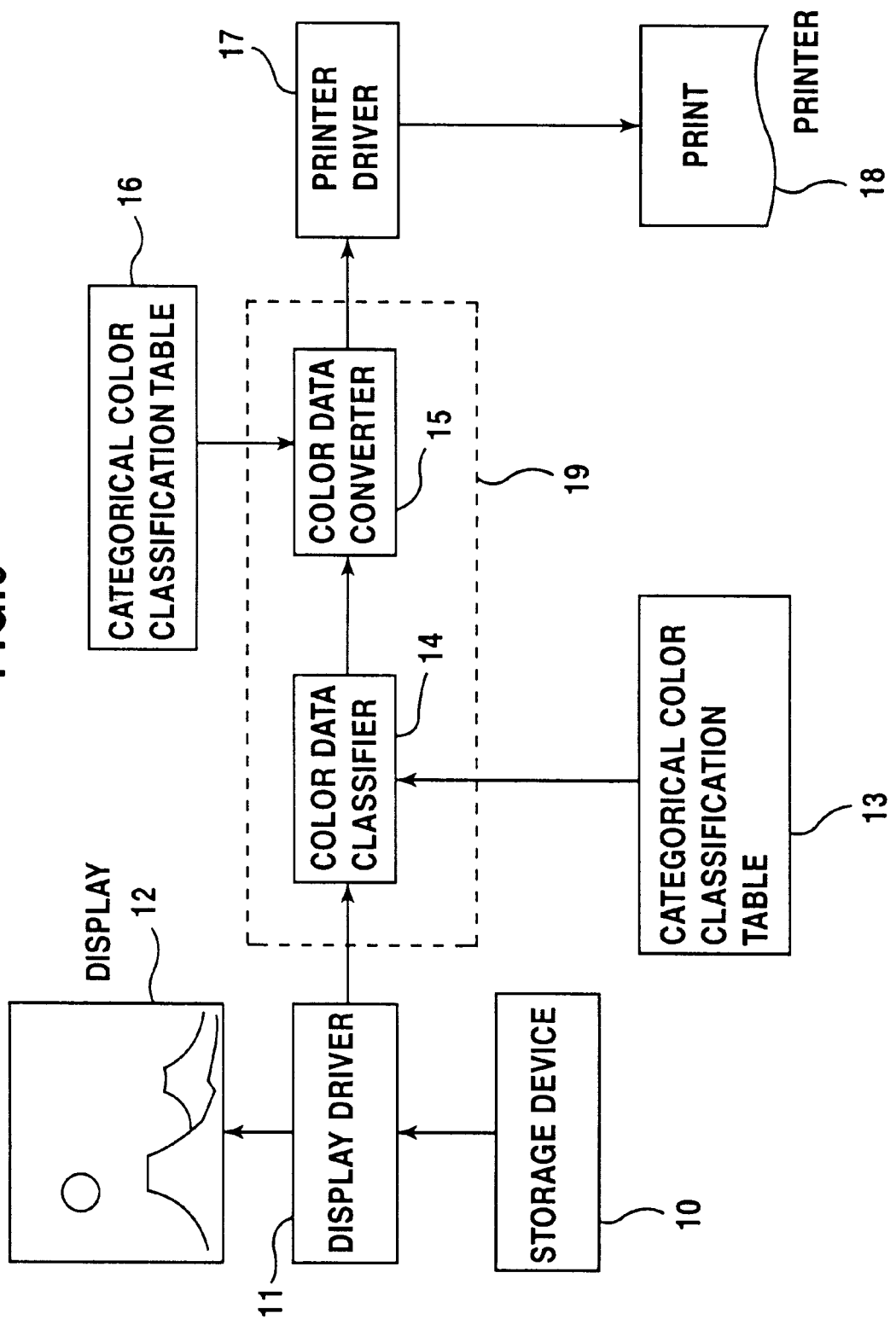

| L* | a* | b* | COLOR CODE |
|---|---|---|---|
| 0 | 0 | 0 | 1 |
| 10 | 0 | 0 | 1 |
| . | 10 | . | 2 |
| . | 20 | . | . |
| . | . | . | . |
| . | . | 10 | 5 |
| . | . | . | . |
| . | . | . | . |
| . | . | . | . |
| . | . | . | . |

~ 13

Cat
1 : WHITE
2 : GRAY
3 : BLACK
4 : RED
  .
  .
  .
11 : BROWN

GAMUT OF PRINTER

GAMUT OF DISPLAY UNIT

FIG.10A

S4
DETERMINE THE RANGE OF Cat1 AND Cat1'

S5
CALCULATE AND STORE A PARAMETER FOR GAMUT MAPPING (COMPRESSION)

FIG.10B

S6
SELECT A COMPRESSION PARAMETER CORRESPONDING TO Cat1

S7
CONVERSION PROCESS

DETERMINE A STRAIGHT LINE INTERCONNECTING THE REFERENCE POINT (Lc,ac,bc) AND INPUT POINT (L1,a1,b1)

S21

CALCULATE A DISTANCE d3 BETWEEN (Lc,ac,bc) AND (L1,a1,b1)

S22

DETERMINE CONVERTED DATA (L1',a1',b1') AS A POINT ON THE STRAIGHT LINE WHICH IS SPACED FROM THE POINT (Lc,ac,bc) BY THE DISTANCE d3·d2/d1

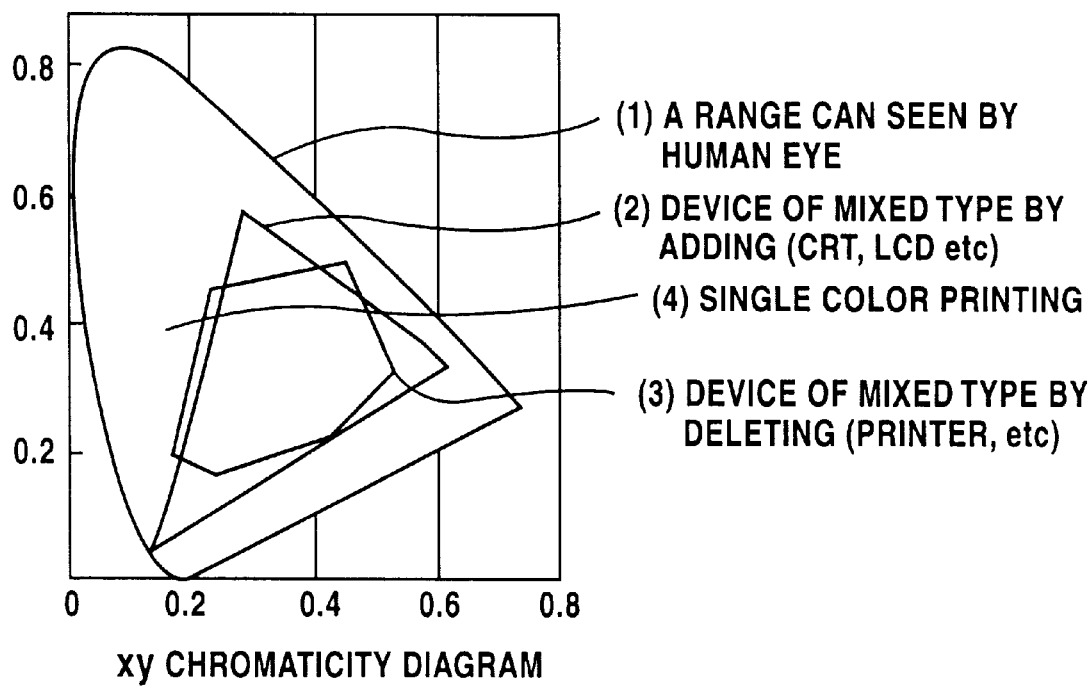

METHOD OF AND APPARATUS FOR CONVERTING COLOR DATA

BACKGROUND OF THE INVENTION

1. Field of the Invention

The present invention relates to a method and apparatus for converting color data for a color image device having a first gamut into color data for a color image device having a second gamut.

2. Description of the Related Art

In view of recent advances in the computer technology and recent availability of computers at lower costs, color image devices, i.e., devices which handle color images, are combined in a growing number of applications to process color image data. For example, a color image that is captured by a digital camera or a scanner is displayed on a CRT display unit or printed by a color printer, or displayed on a CRT display unit in one location and on a liquid crystal display unit in another location.

Generally, different color image devices have different color characteristics. Therefore, a color image may be displayed and printed in different colors on different color image devices. For example, a color image displayed on a display unit may be expressed in different colors when printed by a color printer.

In many applications, a color image is generated on the display screen of a color display unit, and then printed by a color printer. Even if a color image looks fine on a display screen, it may lose the brightness of colors or makes the face of a person pale in the color image when printed. Printing companies generate a color image design or layout on a display screen, and prints a color image based on the color image design or layout displayed on the display screen. If the colors of the color image displayed on the display screen differ from those of the printed color image, then it is necessary to generate a color image design or layout again on the display screen.

For this reason, a gamut conversion technology is required to make image colors look the same on all color image devices.

FIG. 18 of the accompanying drawings shows a conventional gamut conversion system, and FIG. 19 of the accompanying drawings is a chromaticity diagram showing gamuts of color image devices. FIGS. 20A, 20B, and 20C of the accompanying drawings are illustrative of how the conventional gamut conversion system operates.

As shown in FIG. 18, the conventional gamut conversion system includes a color management system (CMS) 94 which converts color data using profiles representing the color characteristics of color image devices, so that the colors will look the same on all the color image devices. Specifically, input color data supplied from a scanner 90 is converted into a standard signal, e.g., L*a*b* signal, by a color correction circuit 91. Specifically, the color correction circuit 91 converts the input color data supplied into the standard signal using a profile of the scanner 90.

For displaying the input color data on a display unit 93, the standard signal from the color correction circuit 91 is converted into an RGB signal by a color correction circuit 92. Specifically, the color correction circuit 92 converts the standard signal into the RGB signal using a profile of the display unit 93. For printing the input color data on a printer 96, the standard signal from the color correction circuit 91 is converted into a YMC signal by a color conversion circuit 95. Specifically, the color conversion circuit 95 converts the standard signal into the YMC signal using a profile of the printer 96.

To obtain the profile of a color image device, sample colors are entered into the color image device and displayed or printed thereby. The sample colors and the displayed or printed colors are associated with each other, thus producing the profile of the color image device.

However, there are some colors that cannot be confirmed by the profile thus produced. For example, the colors displayed on the display unit include colors that cannot be printed on the printer, and the colors that can be reproduced by the printer include colors that cannot be displayed on the display unit.

FIG. 19 illustrates gamuts of various color image devices represented in an XYZ color space. As shown in FIG. 19, the ranges of colors they are called "gamut" that can be reproduced by different color image devices, which include a display unit and a printer, are relatively small and different from each other. For example, a clear and bright green can be displayed on the display unit, but cannot be printed by the printer. A dark blue and a deep green cannot be distinguished from black on the display unit, though they can be printed by the printer. This is because the display unit and the printer have different gamuts that can be reproduced thereby.

Colors cannot physically accurately be converted between color image devices which have different gamuts. Stated otherwise, those colors which cannot be reproduced by a color image device cannot be converted into colors for reproduction by another color image device. Therefore, it is necessary to convert gamuts between different color image devices for allowing a color reproduced by the color image devices to be visually perceived as the same color. Such a gamut conversion is also referred to a gamut compression because it is often used to convert a wide gamut for a display unit into a narrow gamut for a printer.

FIGS. 20A, 20B, and 20C illustrate how the conventional gamut conversion system operates. In FIGS. 20A, 20B, and 20C, regions enclosed by solid lines indicate the gamut of a printer, white dots indicate pixel colors of an image, and black dots indicate colors outputted by the printer.

For a natural image, it is preferable to preserve a balance of the gradations of image data and the colors of the entire image, rather than the accuracy of individual colors of the image. To this end, as shown in FIG. 20A, the entire image data that is involved is uniformly reduced such that the overall gamut of a source device, e.g., a display unit, will be contained in the gamut of a destination device, e.g., a printer. The data reduction ratio is varied depending on the magnitude of saturation. For example, if the saturation of a color is small, then the color data is not essentially reduced. As the saturation becomes larger, the data reduction ratio is increased, so that the maximum saturation will enter the gamut of the destination device.

For applications of graphs and computer graphics, the clearness of colors is preserved. As shown in FIG. 20B, the saturations of colors are preserved whereas the lightnesses thereof may be changed.

For accurately preserving colors, as shown in FIG. 20C, those color data of a source device which fall within the gamut of a destination device are not converted, and the other color data of the source device which fall outside the gamut of the destination device are converted to closest color data in the gamut of the destination device. This process is called gamut mapping.

As described above, the conventional gamut mapping system processes the entire gamut to convert color data of the source device into color data of the destination device.

There has also been known a gamut mapping process for classifying gamuts of input and output image devices into categorical colors, and converting colors in the same gamut. See, for example, "Categorical Color Mapping for Gamut Mapping" presented in 5th Color Imaging Conference held by IS & T and SID, Nov. 18, 1997. According to this gamut mapping process, color category regions are assumed to be three-dimensional ellipses, and a category to which a color belongs is determined by the Mahalabinos Distance from the center of each of the regions to determine a converted color.

FIG. 21 of the accompanying drawings illustrates problems of the conventional gamut mapping process.

The conventional gamut mapping system operates simply to reduce a gamut, and does not ensure that an image of converted colors will look like an image of original colors to the human eye, e.g., depends on the human visual perception. If the overall gamut is reduced, the colors visually perceived by the human eye are altered due to the conversion of color data, so that the converted colors will lose natural details. For example, color data-which originally represents a near skin color may come to express light pink after being converted. Consequently, colors converted by the conventional gamut mapping system make the viewer feel annoyed as they are different from the original colors.

According to the conventional gamut mapping process for classifying gamuts into categorical colors, since the ranges of categorical colors are approximated by ellipses, there are many color classification errors, making it difficult to convert image data accurately into categorical colors. Furthermore, the conventional gamut mapping process requires complex processing operations to classify gamuts into categorical colors.

The conventional gamut mapping system effects its processing uniformly on all color data so that the overall gamut of a source device will be contained in the gamut of a destination device. As shown in FIG. 21, the range of colors reproducible by a general color image device is not uniform for all the colors, but deformed for the respective colors. For example, a color reproducible range of a CRT display unit has a pointed wide area for a clear green, but a narrow area for a dark green. If the pointed wide area is to be contained in a color reproducible range of a printer, then the overall color reproducible range of the CRT display unit needs to be reduced considerably. As a result, a color image whose gamut has been converted into color reproducible range of the printer and printed by the printer is less clear and poorer in image quality.

SUMMARY OF THE INVENTION

It is therefore an object of the present invention to provide a method of and an apparatus for converting color data without causing color alterations.

Another object of the present invention is to provide a method of and an apparatus for converting color data while keeping clear color images produced from converted color data.

According to the present invention, color data are converted based on human categorical color perception. There is provided in accordance with the present invention a method of converting first color data contained in a gamut of a first image device into second color data contained in a gamut of a second image device, comprising the steps of classifying the first color data into corresponding colors by referring to a classification table representing the correspondence between colors determined based on human color perception and the first color data, and converting the first color data into the second color data with respect to each of the classified colors.

Since each of colors of an input color image which are based on the human color perception is converted for a gamut, colors are prevented from being altered due to the conversion. Because each of colors of an input color image is converted, a color data reduction ratio for compressing the color data can be increased, and the clearness of the color image will not be lost. Each of colors of an input color image can accurately be converted into a categorical color using a categorical color classification table. Accordingly, color classification errors are prevented from occurring. The colors can also be converted simply because the categorical color classification table is referred to.

Other features and advantages of the present invention will become readily apparent from the following description taken in conjunction with the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principle of the invention, in which:

FIGS. 2A and 2B are diagrams showing color classifications carried out by categorical perception according to a first embodiment of the present invention;

FIG. 6 is a block diagram of a color data converting apparatus according to the first embodiment of the present invention;

FIGS. 10A and 10B are flowcharts of a converting process carried out by the color data converting apparatus shown in FIG. 6;

FIG. 13 is a flowchart of a region converting subroutine in the converting process shown in FIG. 10B;

FIG. 19 is a chromaticity diagram showing gamuts of color image devices;

DETAILED DESCRIPTION OF THE PREFERRED EMBODIMENTS

Colors recognized according to human categorical perception will first be described below with reference to FIGS. 2A, 2B through 4A, 4B. Colors recognized according to human categorical perception are discussed in "Categorical perception and memory of colors" by Uchikawa, pages 7–14, collected preprints for 7th Color Engineering Conference, 1990, "Categorical color name regions in a color space in aperture and surface color modes" by Uchikawa, et. al., Journal of Illumination Society, Vol. 77, No. 6, 1993, and Japanese laid-open patent publication No. 8-123958.

According to the theory of categorical perception, a human being perceives all colors by classifying them into at most 10–12 colors. For example, the human being perceives both a light red and a yellowish red as red.

FIGS. 2A, 2B through 4A, 4B show color classifications in xy chromaticity diagrams at respective luminances of 2 $cd/M^2$, 5 $cd/m^2$, 10 $cd/m^2$, 20 $cd/m^2$, 30 $cd/m^2$, and 40 $cd/m^2$. The data in FIGS. 2A, 2B through 4A, 4B were prepared by experimentally determining distances with respect to all colors perceived by a plurality of human beings as examinees. The colors perceived by the examinees include red, pink, purple, blue, black/gray/white, green, yellow, and orange, which are represented by respective symbols including white rectangles, white triangles, white lozenges, black circles, white circles, black lozenges, black rectangles, and black triangles. Larger symbols represent colors that all the examinees agreed in perceiving (100% agreement), and smaller symbols represent colors that half the examinees agreed in perceiving (50% agreement).

As shown in FIGS. 2A, 2B through 4A, 4B, the colors included in a region covered by one symbol are perceived as one color by all human beings. It can be seen that human perception of colors does not involve significant individual differences and is stable. Therefore, it has experimentally been proved that the human beings perceive all colors as about 10–12 color classifications. It has been said that a developed language at present has 11 basic color category names. For example, the Japanese language has 11 basic color category names which include white, gray, black, red, orange, yellow, green, blue, purple, pink, and brown.

The colors contained in the triangular area shown in each of FIGS. 2A, 2B through 4A, 4B are progressively clearer toward the outer edges of the triangular area. However, as can be understood from colors present near the center of the triangular area and near the outer edges thereof, the human beings perceive colors having different levels of clearness as a color of one category.

Figure 5B:
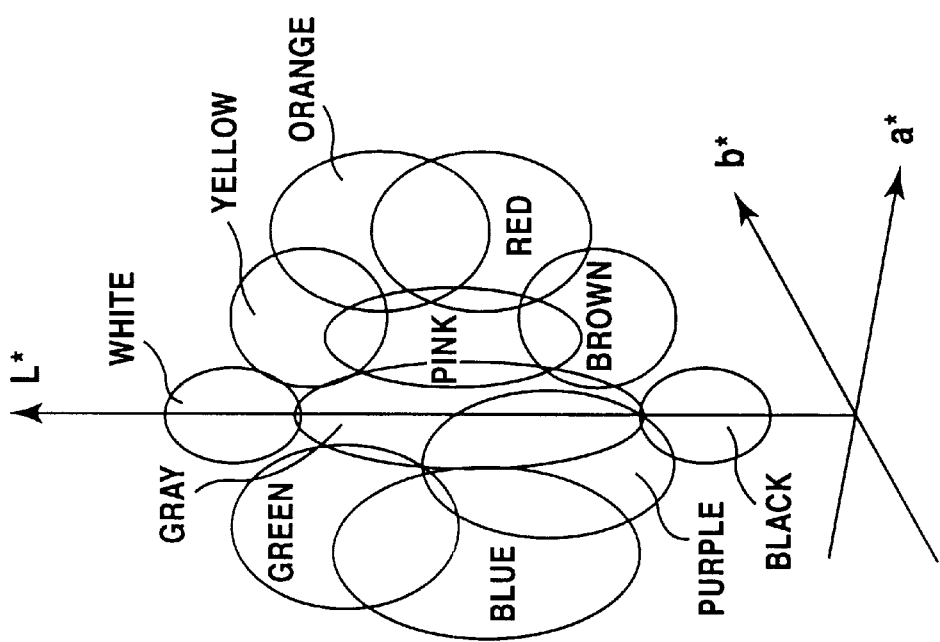
FIGS. 5A and 5B are diagrams showing colors classified according to categorical perception according to the first embodiment of the present invention.
Figure 5A:
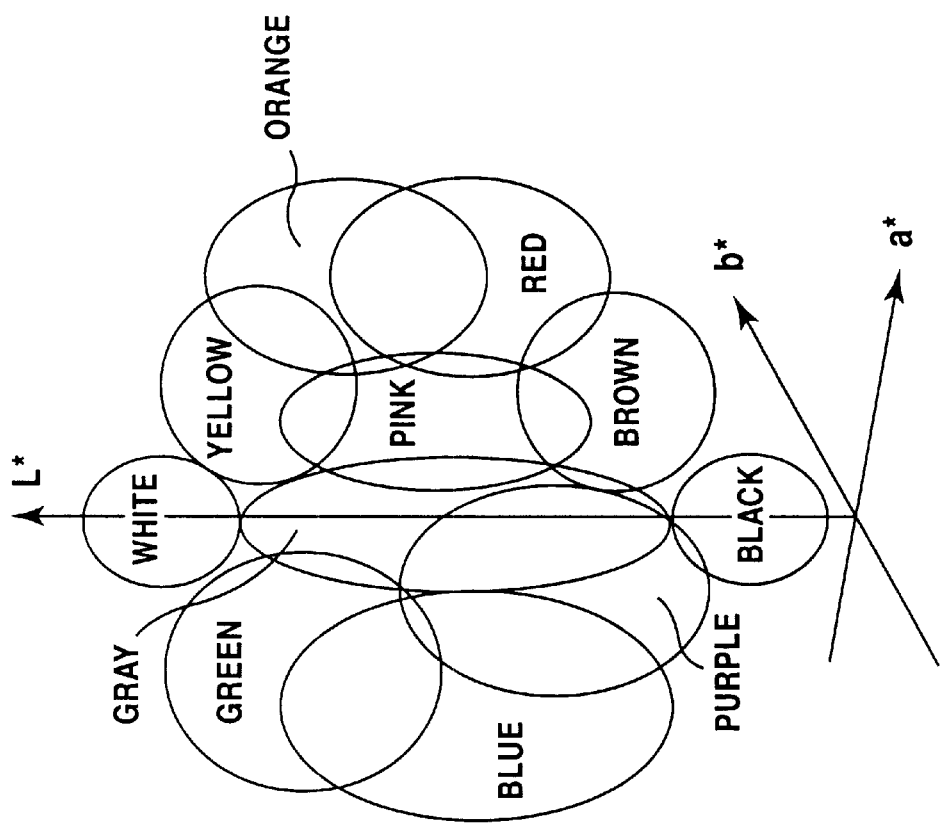

FIGS. 5A and 5B show colors classified according to categorical perception in an L*a*b* uniform color space. In the L*a*b* uniform color space, the axis L* represents lightness, a direction around the axis L* represents color differences (hue), and a direction away from the axis L* represents clearness (saturation).

FIG. 5A illustrates a range of colors that can be reproduced by a display unit (first color image device), and FIG. 5B illustrates a range of colors that can be reproduced by a printer (second color image device). It will be seen from FIGS. 5A and 5B that the gamut of the printer is smaller than the gamut of the display unit.

Figure 1:
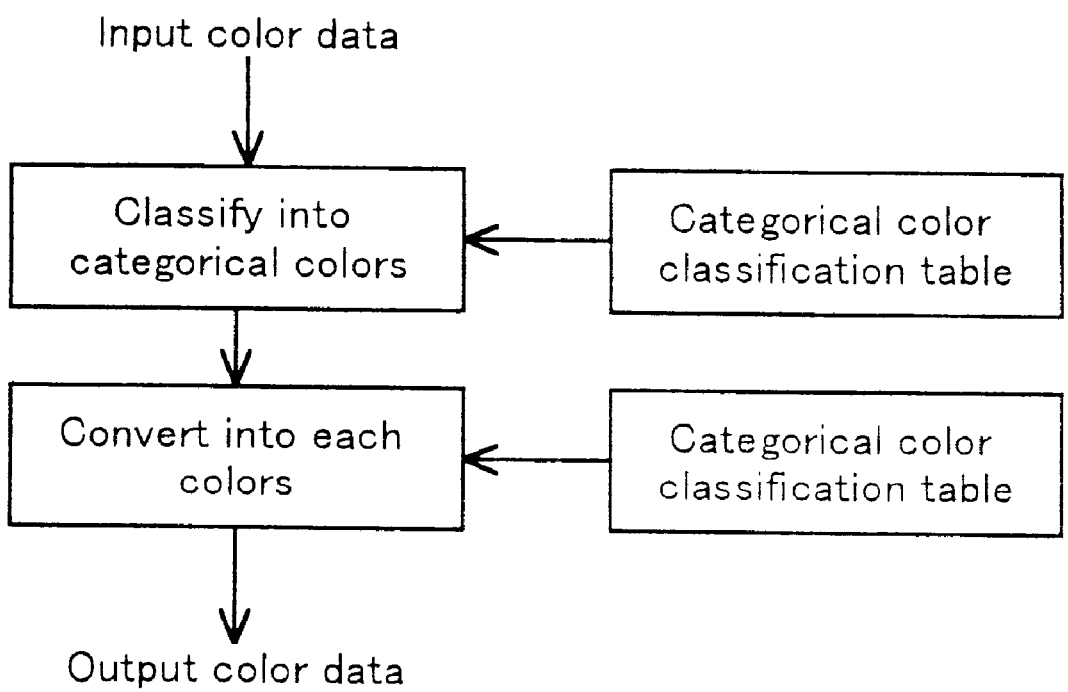
FIG. 1 is a block diagram showing the principles of the present invention.
Figure 3A:
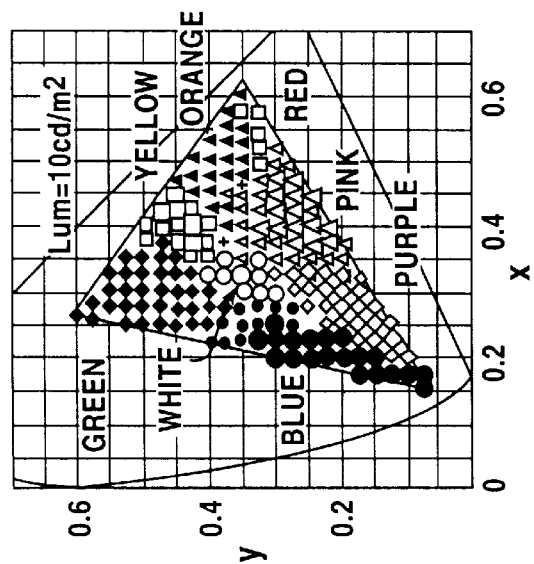
FIGS. 3A and 3B are diagrams showing color classifications carried out by categorical perception according to the first embodiment of the present invention.
Figure 3B:
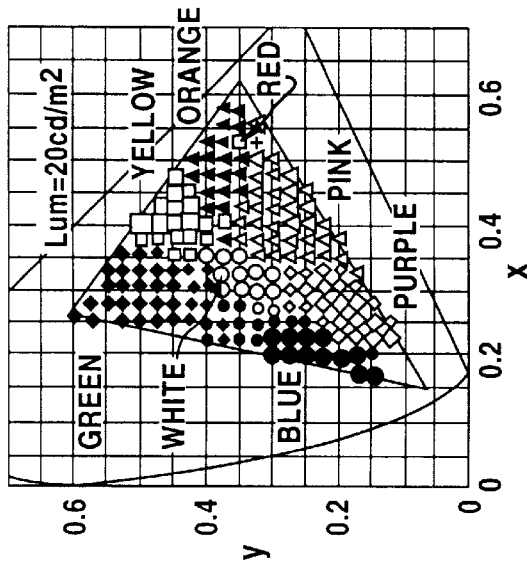
Figure 4A:
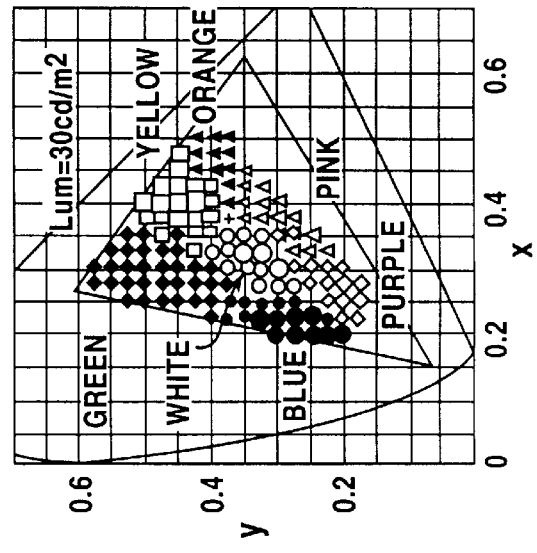
FIGS. 4A and 4B are diagrams showing color classifications carried out by categorical perception according to the first embodiment of the present invention.
Figure 4B:
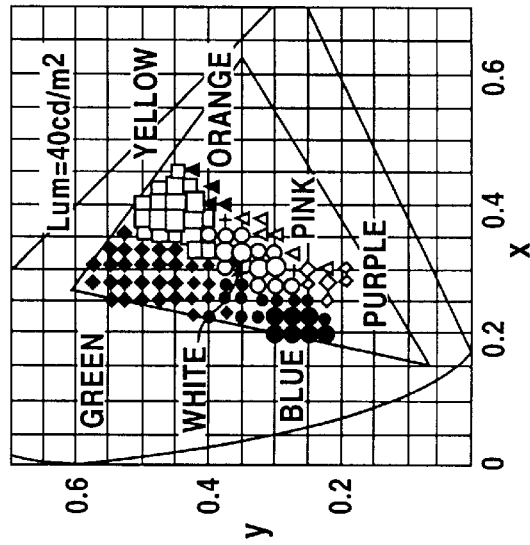

As shown in FIG. 1, input color data (RGB data) from the display unit are converted into L*a*b* data, which are classified into categorical colors by a categorical color classification table generated according to the gamut shown in FIG. 5A. Then, the data contained in the respective regions of the categorical colors are converted by a categorical color conversion table into data in the respective regions of colors that can be reproduced by the printer, as shown in FIG. 5B.

According to the present invention, the color data of color classifications perceived by the human eye are separately converted into color data. Therefore, colors perceived by the human eye before their color data are converted are prevented from being altered after their color data are converted. Furthermore, since the color data is converted in each color region, the overall gamut does not need to be reduced, thus preventing the clearness of color images from being lost.

Each color of a color image can accurately be classified into a categorical color using the categorical color classification table which is based on the human color perception. Consequently, color classification errors are prevented from occurring when colors are classified. Colors can be classified simply because the categorical color classification table is used for the classification.

FIG. 6 shows in block form a color data converting apparatus according to a first embodiment of the present invention.

As shown in FIG. 6, color image data stored in a storage device 10 such as a disk or the like are displayed on a display unit 12 such as a CRT, an LCD, or the like by a display driver 11. For printing the displayed color image on a printer 18, it is necessary to convert the gamut of the display unit 12 into the gamut of the printer 18.

For such color conversion, each color of the color image data stored in the storage device 10 is classified by a color data classifier 14 using a categorical color classification table 13.

Each categorical color of the classified color data generated by the color data classifier 14 is then converted into color data reproducible by the printer 18 by a color data converter 15 using a categorical color conversion table 16. The produced color data from the color data converter 15 are supplied through a printer driver 17 to the printer 18, which prints the color data.

The color data classifier 14 and the color data converter 15 are implemented by a single processor 19, and expressed as separate blocks that are actually functions performed by the processor 19.

The processes of classifying and converting the color data will be described in detail below.

Figures 7A, 7B, 7C:
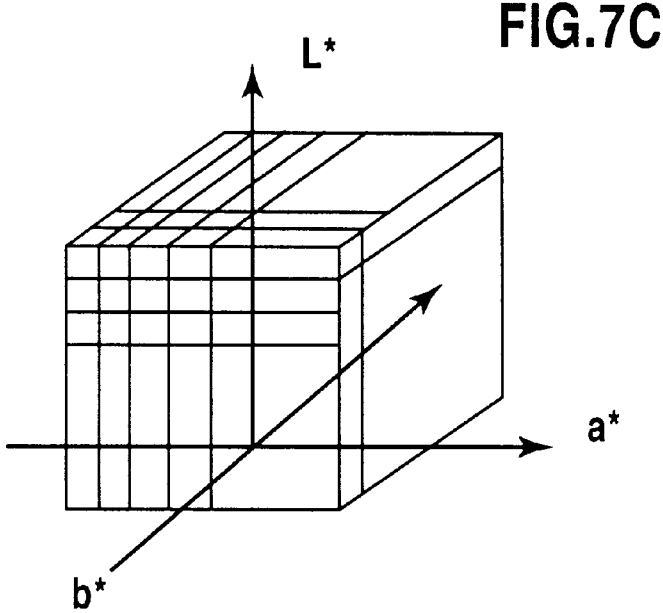
FIGS. 7A, 7B, and 7C are diagrams illustrative of a categorical color classification table in the color data converting apparatus shown in FIG. 6.
Figure 8:
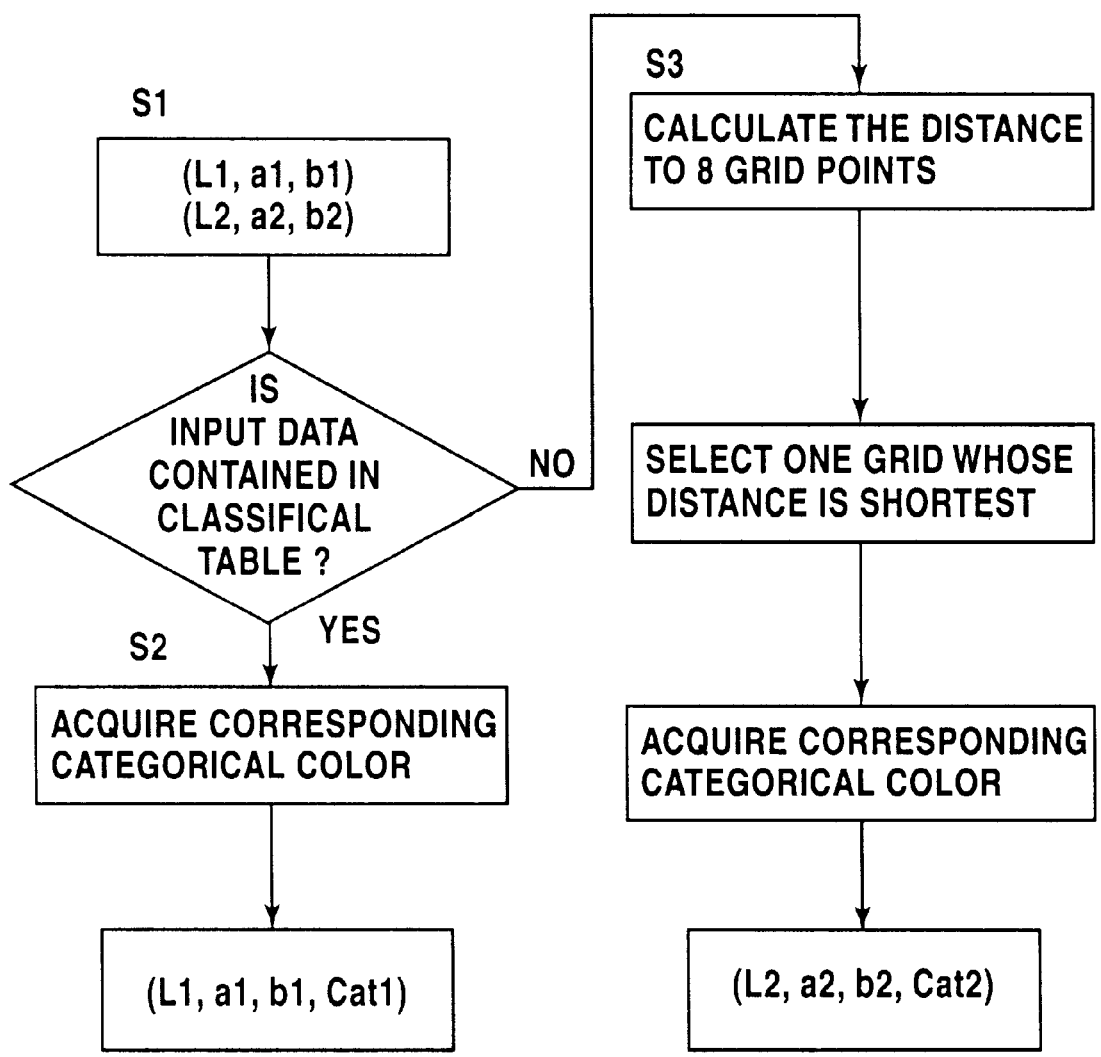
FIG. 8 is a flowchart of a classifying process carried out by the color data converting apparatus shown in FIG. 6.
Figure 9B:
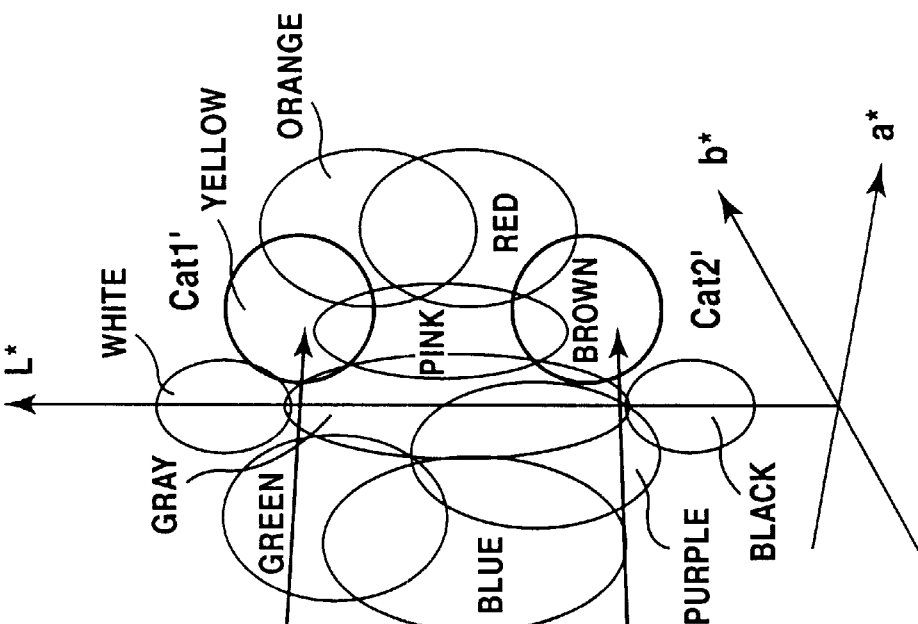
FIG. 9 is a diagram showing the relationship between the gamuts of a display unit and a printer of the color data converting apparatus shown in FIG. 6.
Figure 9A:
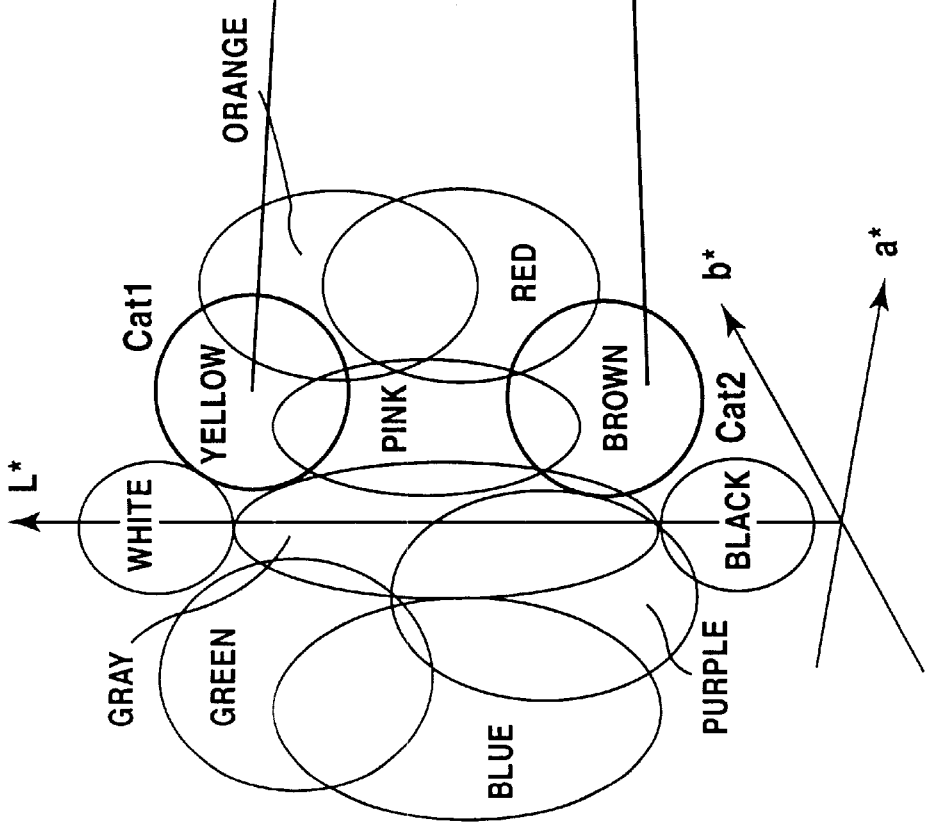

FIGS. 7A, 7B, and 7C illustrate the categorical color classification table 13. FIG. 8 shows the classifying process, and FIG. 9 shows the relationship between the gamuts of the display unit 12 and the printer 18.

It is assumed that the color image data stored in the storage unit 10 comprise RGB data (NTSC). The RGB data are converted into data in the L*a*b* color space which is one type of uniform color spaces. As is well known in the art, formulas for converting color image data from the RGB format into the L*a*b* format are expressed by the following equations (1), (2):

$$X=0.6067*R+0.1736*G+0.2001*B$$
$$Y=0.2988*R+0.5868*G+0.1144*B$$
$$Z=0.0661*G+1.1150*B \quad (1)$$
$$L^*=116*(Y/YO)^{1/3}-16 \text{ (in case } Y/YO>0.008856)$$
$$L^*=903.25*(Y/YO) \text{ (in case } Y/YO\cdot0.008856)$$
$$a^*=500*[(X/XO)^{1/3}-(Y/YO)^{1/3}]$$
$$b^*=200*[(Y/YO)^{1/3}-(Z/ZO)^{1/3}] \quad (2)$$

where XO, YO, ZO represent tristimulus values of a reference white surface.

The color image data converted into the L*a*b* color space are then classified into categorical colors using the categorical color classification table 13. As shown in FIG. 7C, the L*a*b* color space is divided into a three-dimensional pattern of grid points corresponding to 10 values along each of the axes L*, a*, b*. As shown in FIG. 7B, the categorical colors at the respective grid points are represented by color codes Cat. The color codes Cat have respective values that indicate the categorical colors which include white, gray, black, etc.

As shown in FIG. 7A, the categorical color classification table 13 has color codes of the grid points of the L*a*b* color space. The contents of the categorical color classification table 13 are determined by the gamut of the display unit 12 which is shown in a left-hand side of FIG. 9.

Using the categorical color classification table 13, color image data (L1, a1, b1) in the L*a*b* format is converted into classified data (L1, a1, b1, Cat1) where Cat1 represents a classified color region of the color image data (L1, a1, b1).

FIG. 8 shows a classifying process carried out by the color data converting apparatus shown in FIG. 6. In FIG. 8, S1, S2, S3 denote various steps of the classifying process.

(S1) It is decided whether the value of input color data (L1, a1, b1 or L2, a2, b2) is contained in the categorical color classification table 13, i.e., whether the categorical color classification table 13 contains a grid point which agrees with the value of input color data.

(S2) If the value of input color data (L1, a1, b1 or L2, a2, b2) is contained in the categorical color classification table 13, then a corresponding categorical color Cat1 is acquired from the categorical color classification table 13. Then, classified data (L1, a1, b1, Cat1) is outputted.

(S3) If the value of input color data (L2, a2, b2) is not contained in the categorical color classification table 13, then the distances from a point corresponding to the value of input color data to 8 grid points (contained in the categorical color classification table 13) which surrounds the corresponding point are calculated in the three-dimensional pattern shown in FIG. 7C, and the grid point whose distance to the corresponding point is minimum is selected. A categorical color Cat2 corresponding to the selected grid point is acquired from the categorical color classification table 13. Then, classified data (L2, a2, b2, Cat2) is outputted.

For selecting a grid point, a plane which is closest to the axis L* may be detected, and then a grid point on the detected plane, whose two-dimensional distance to the corresponding point is shortest, may be detected.

The process of converting the classified color data into color data in the gamut of the printer 18 will be described below with reference to FIG. 9. FIG. 9 shows the gamuts of the display unit 12 and the printer 18 as they are classified into categorical colors. As shown in FIG. 9, the color data (L1, a1, b1) of the color region Cat1 of the display unit 12 is converted into color data (L1', a1', b1') of a color region Cat1' of the printer 18 which indicates the same color as the color region Cat1.

For example, the color data (L1, a1, b1) of the color region yellow Cat1 of the display unit 12 is converted into color data (L1', a1', b1') of the color region yellow Cat1' of the printer 18.

The converting process will be described in greater detail below. FIGS. 10A and 10B show the converting process. In FIGS. 10A and 10B, S4, S5, S6, S7 denote various steps of the converting process.

(S4) As shown in FIG. 10A, the range of the color region Cat1' of the printer 18 which corresponds to the color region Cat1 of the display unit 12 is determined. The correspondence between the color regions Cat1', Cat1 is shown in FIG. 12A.

(S5) Then, a parameter for gamut mapping (compression) is calculated for each color region (yellow, red, blue, brown, etc.), and stored in the categorical color conversion table 16 (see FIG. 6). Next the conversion process will be discussed using FIG. 10B.

(S6) As shown in FIG. 10B, a compression parameter corresponding to the classified color code Cat1 is called from the categorical color conversion table 16.

(S7) Then, using the compression parameter, the classified color data (L1, a1, b1) is converted into data (L1', a1', b1') for the printer 18.

Figure 11:
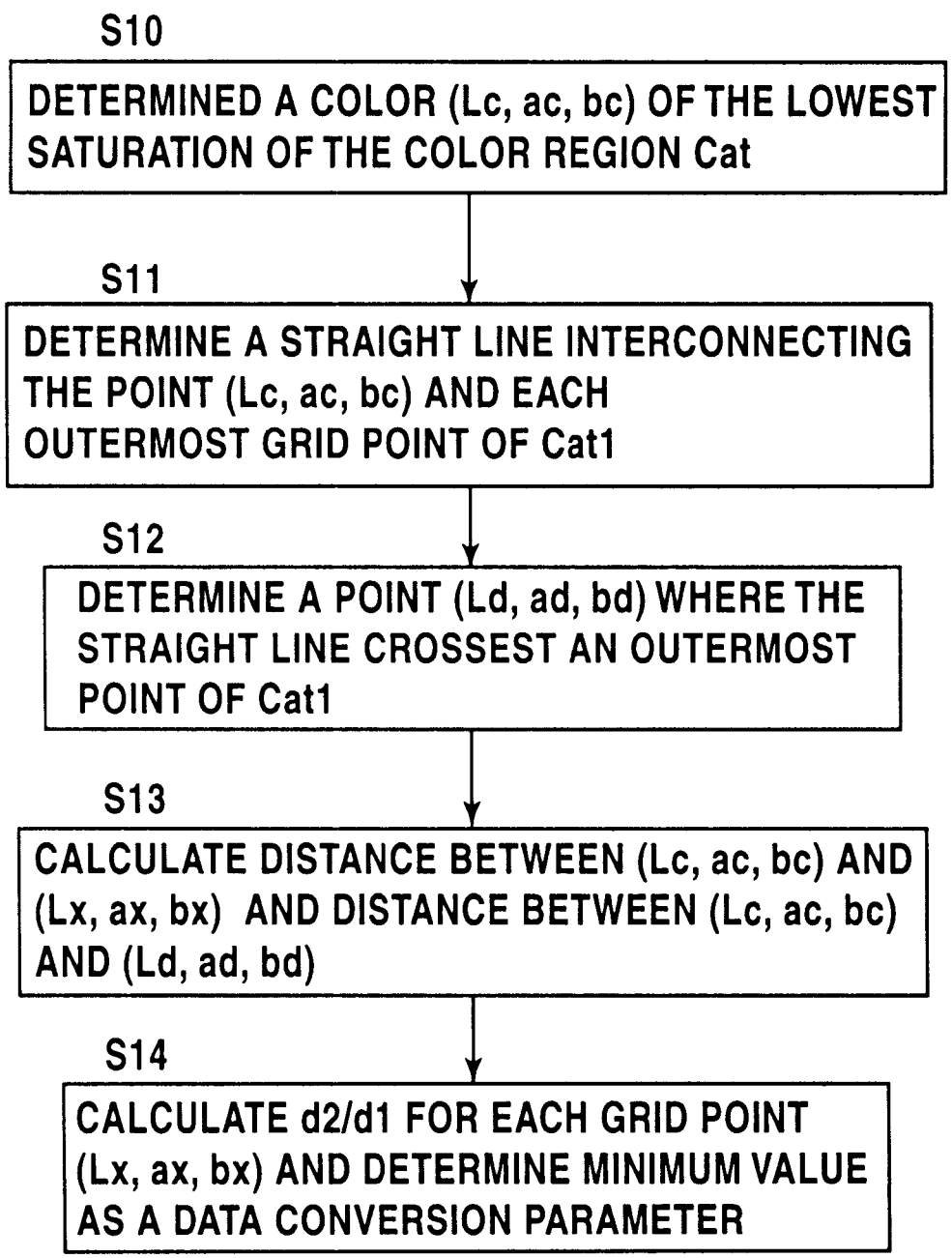
FIG. 11 is a flowchart of a parameter calculating subroutine in the converting process shown in FIG. 10A.
Figure 12B:
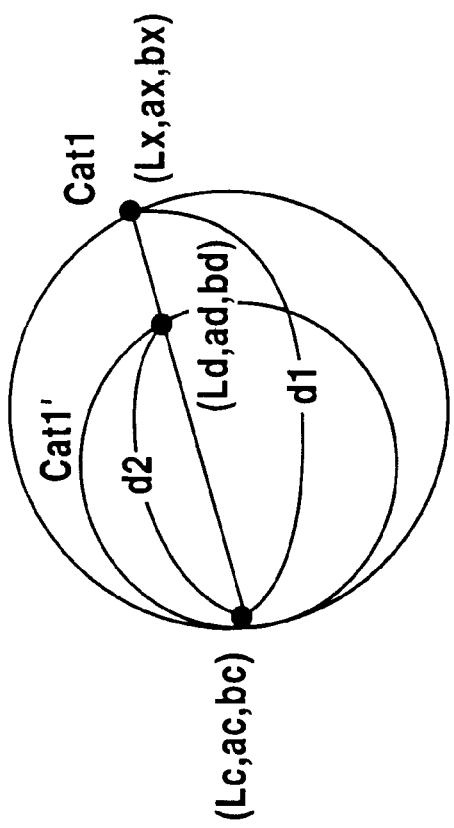
FIGS. 12A and 12B are diagrams illustrative of the parameter calculating subroutine shown in FIG. 11.
Figure 12A:
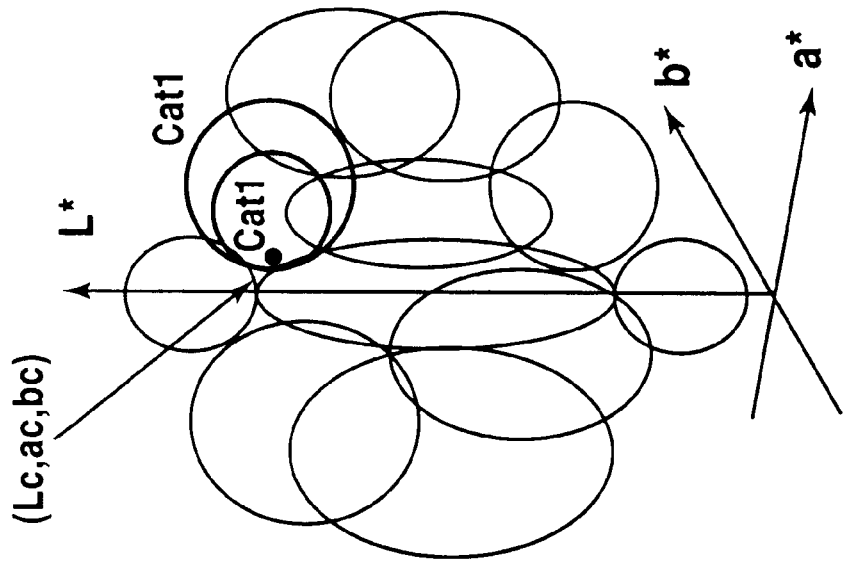

FIGS. 11, 12A and 12B show a process of calculating a parameter for uniformly reducing a region to convert colors. In FIG. 11, S10, S11, S12, S13, S14 denote various steps of the calculating process.

(S10) As shown in FIG. 12B, a color (Lc, ac, bc) of the lowest saturation of the color region Cat1 of the display unit 12 is determined. Since this color has a low saturation, it is contained in the color region Cat1' of the printer 18 which is a destination device. If there are a plurality of colors of the lowest saturation, then one of those colors which has an intermediate lightness, i.e., a color whose lightness is intermediate between maximum and minimum lightnesses of those colors, is determined.

(S11) Then, a straight line interconnecting the point (Lc, ac, bc) and each outermost grid point (Lx, ax, bx) of the color region Cat1 of the display unit 12 is determined.

(S12) A point (Ld, ad, bd) where the straight line crosses an outermost point of the color region Cat1' of the printer 18 is determined.

(S13) The length d1 of the determined straight line is calculated. That is, the distance d1 between the point (Lc, ac, bc) and each grid point (Lx, ax, bx) of the color region Cat1 of the display unit 12 is calculated. Furthermore, the distance d2 between the point (Lc, ac, bc) and the outermost point (Ld, ad, bd) of the color region Cat1' of the printer 18 is calculated.

(S14) The ratio d2/d1 of the distance d2 to the distance d1 for each grid point (Lx, ax, bx) is calculated. The minimum value of the ratio d2/d1 is regarded as a reduction ratio for the region as a whole. This reduction ratio serves as a data conversion parameter for the color region Cat1.

In this manner, data conversion parameters for the gamuts of the display unit 12 and the printer 18 are calculated in advance, and stored in the categorical color conversion table 16.

Figure 14:
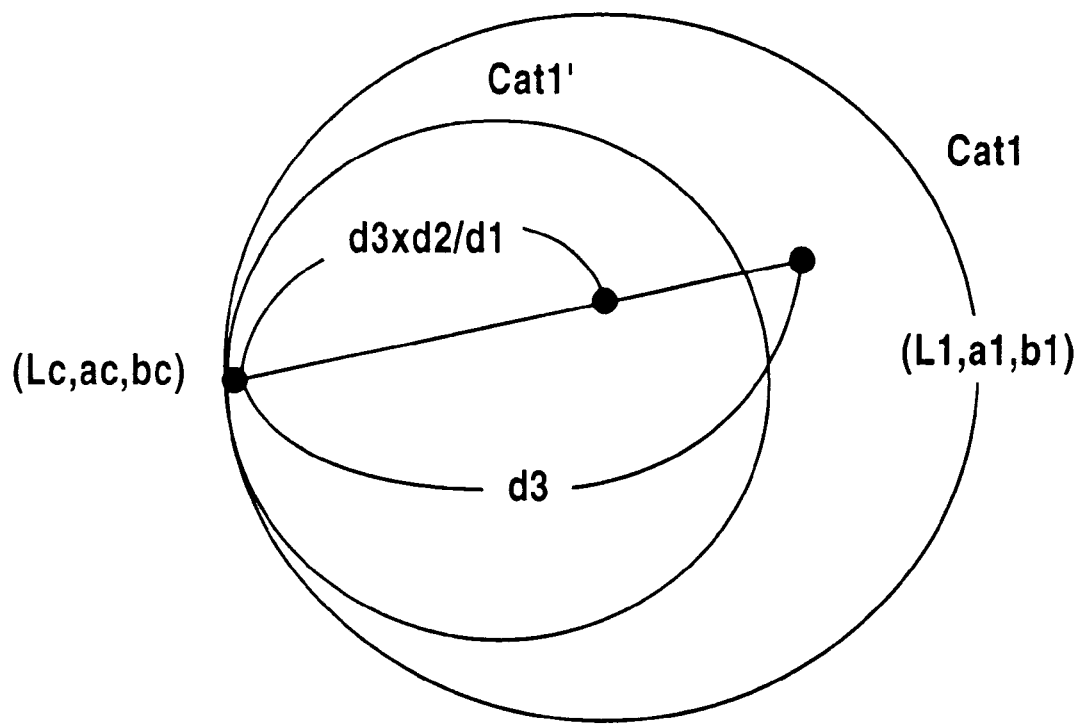
FIG. 14 is a diagram illustrative of the region converting subroutine.

A region converting process will be described below with reference to FIGS. 13 and 14. In FIG. 13, S20, S21, S23 denote various steps of the calculating process.

(S20) A reference point (Lc, ac, bc) of the color region Cat1 is determined from the categorical color conversion table 16. Then, a straight line interconnecting the reference point (Lc, ac, bc) and an input point (L1, a1, b1) is determined.

(S21) The distance d3 between the reference point (Lc, ac, bc) and the input point (L1, a1, b1) is calculated.

(S22) The data conversion parameter d2/d1 for the color region Cat1 is called from the categorical color conversion table 16. The data conversion parameter d2/d1 is multiplied by the distance d3 thereby to determine a distance d3·d2/d1 on the straight line from the reference point (Lc, ac, bc). A point on the straight line which is spaced from the reference point (Lc, ac, bc) by the distance d3·d2/d1 is regarded as converted data (L1', a1', b1').

The above processing is effected on all input data to complete the compression of the color regions of the entire color image which has been inputted. Therefore, the color data in the color region Cat1 of the display unit 12 are all converted so as to be contained within the color region Cat1' of the printer 18.

The conversion of colors in one color region has been described above by way of example. Alternatively, a reference color may be extracted from a certain lightness range in each color region, and the above conversion may be carried out within the lightness range. Though this alternative process requires complex calculations, it allows the ratio d2/d1 to be calculated in each lightness range for making effective the color regions of the printer 18.

The converted data (L1', a1', b1') thus obtained is then converted into YMCK data to be printed. Specifically, the L*a*b* data is first converted into RGB data according to the equations (1), (2), and then the RGB data is converted into YMCK data according to the following equations (3):

$$Y'=1-B$$

$$M'=1-G$$

$$C'=1-R$$

$$K=\min(Y',M',C')$$

$$Y=Y'-K$$

$$M=M'-K$$

$$C=C'-K \quad (3)$$

In this manner, the YMCK data to be printed is produced.

Figure 15:
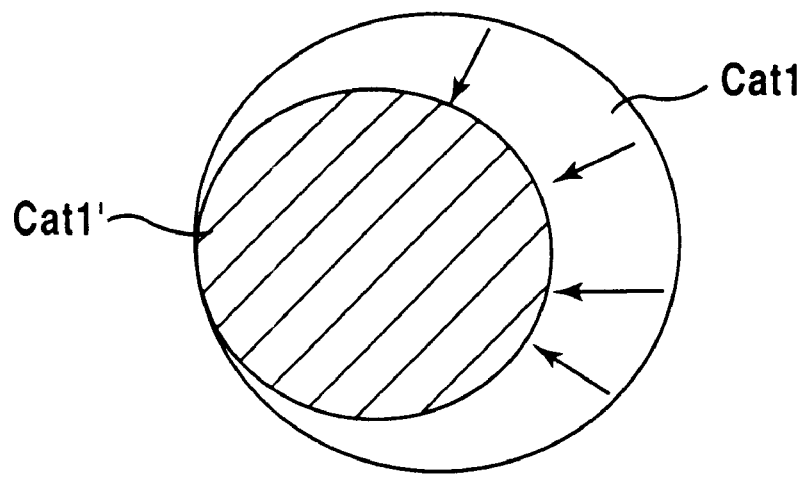
FIG. 15 is a diagram illustrative of a region converting process according to a second embodiment of the present invention.

FIG. 15 shows a region converting process according to a second embodiment of the present invention. In FIG. 15, the color region Cat1 of the display unit 12 is greater than the color region Cat1' of the printer 18 for the same categorical color. No data is converted in an area where the color regions Cat1, Cat1' overlap each other. Stated otherwise, if the color data (L1, a1, b1) of the color region Cat1 is contained within the color region Cat1', then the color data (L1, a1, b1) is used as converted data.

Color data which is not contained in the color region Cat1' but contained in the color region Cat1 is converted to a closest point in the color region Cat1' using a color region classification table which represents a range of color regions of the printer 18. The color region classification table is identical to the categorical color classification table for the display unit 12 shown in FIG. 7A.

Whether color data of the display unit 12 falls in a corresponding color region of the printer 18 or not is decided using the color region classification table. If the color data of the display unit 12 falls in the corresponding color region of the printer 18, then the color data is not converted. Therefore, the color data of the display unit 12 is directly used as color data of the printer 18.

If the color data of the display unit 12 does not fall in the corresponding color region of the printer 18, then the distance from the color data to each grid point in the color region classification table is calculated. A grid point which is closest to the color data is determined from the calculated distances, and the color data of the display unit 12 is replaced with the determined grid point.

The region converting process according to the second embodiment is advantageous in that colors reproducible by the printer 18 can reliably be reproduced, and colors visually perceived by the human eye are not altered.

Figure 16:
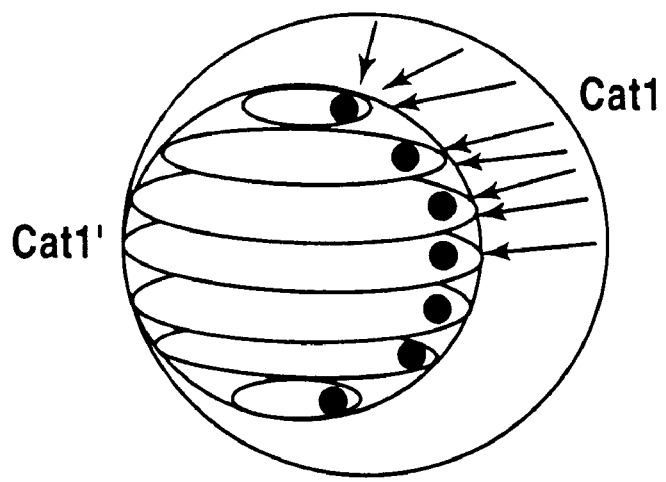
FIG. 16 is a diagram illustrative of a region converting process according to a third embodiment of the present invention.

FIG. 16 shows a region converting process according to a third embodiment of the present invention.

In FIG. 16, the color region Cat1 of the display unit 12 is greater than the color region Cat1' of the printer 18 for the same categorical color. In the third embodiment, the color data in the color region Cat1 is all replaced with one or more reference colors in the color region Cat1'. In FIG. 16, a plurality of reference colors (each indicated by a black circle) are established in respective lightness ranges within the color region Cat1'. The color data in the color region Cat1 checked for its lightness range, and replaced with the reference color in the same lightness range in the color region Cat1'. If there is only one reference color in the color region Cat1', then it may be a color having the highest saturation in the color region Cat1'. Alternatively, if there are a plurality of reference colors established in respective lightness ranges in the color region Cat1', then the reference colors may be colors having the highest saturations in the respective lightness ranges.

If the color data is replaced with only one reference color within the color region, then the amount of data in the conversion table can greatly be reduced. Though this process results in a reduction in the image quality, it is effective to print figures such as graphs. If the color data is replaced with plural reference colors in respective lightness ranges within the color region, then the image quality is prevented from being substantially lowered. For example, if the color data is converted into 11 colors with L* represented by 10 values, then the color data can be converted into a maximum range of 101 colors (white, black, 9 lightnesses×11 colors). This process is capable of reducing the amount of data in the conversion table and also preventing the image quality from being substantially lowered.

Figure 17A:
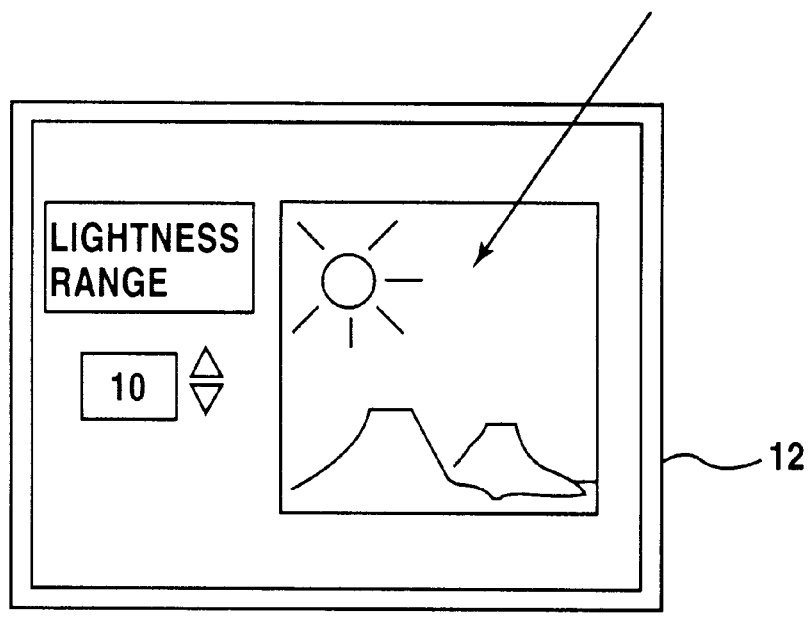
FIGS. 17A and 17B are diagrams illustrative of a process of designating a replacement color in the region converting process shown in FIG. 16.
Figure 17B:
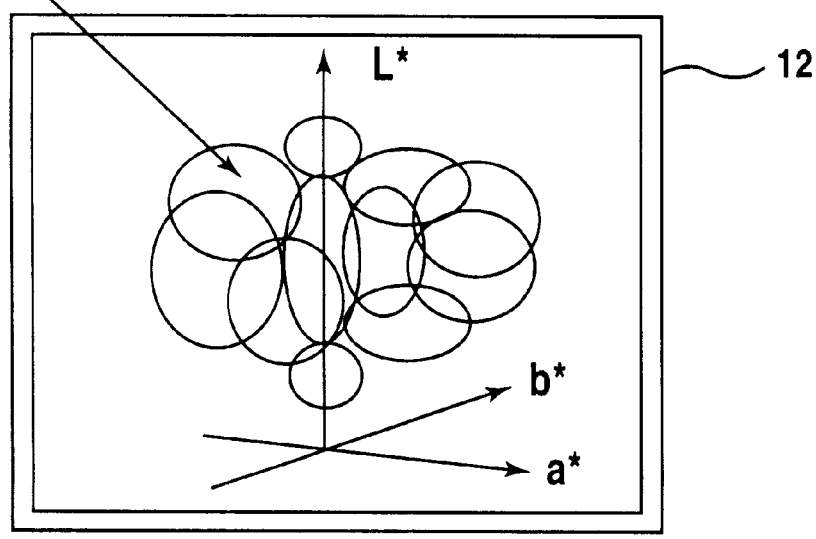
Figure 18:
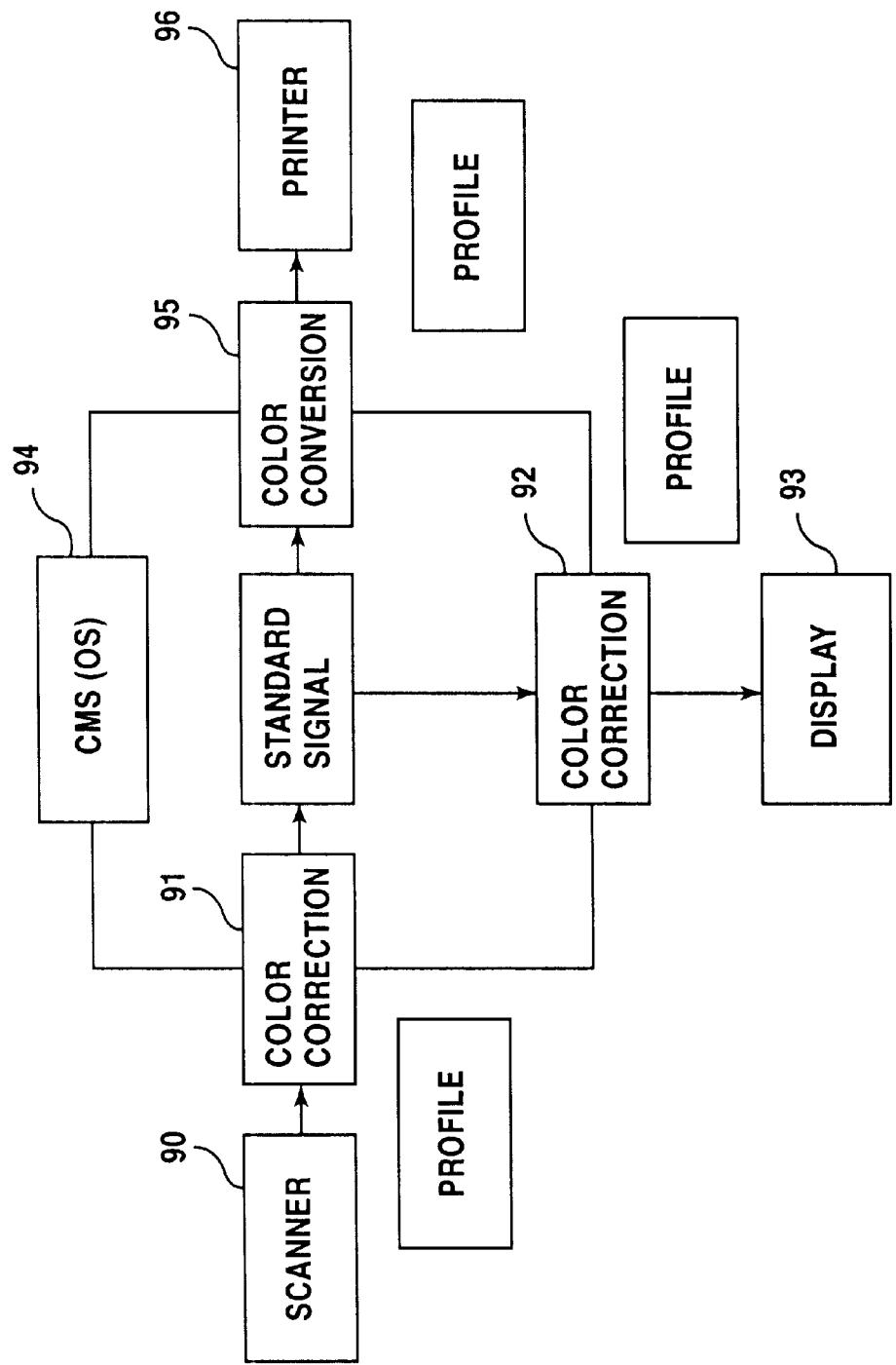
FIG. 18 is a block diagram of a conventional color data conversion system.
Figure 20A:
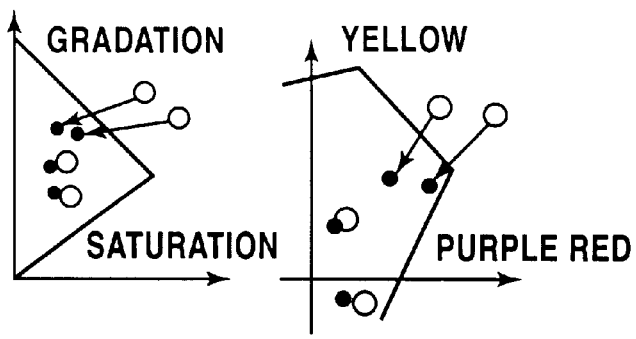
FIGS. 20A, 20B, and 20C are diagrams illustrative of how the conventional gamut mapping system operates.
Figure 20B:
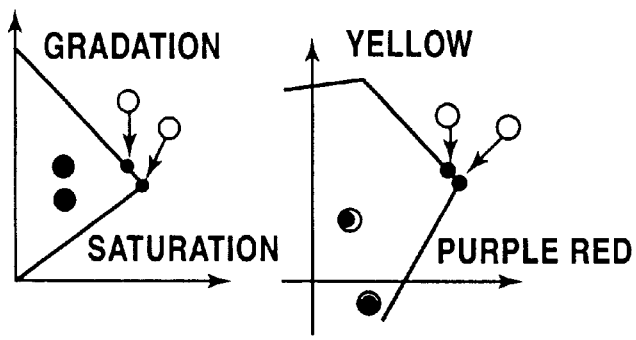
Figure 20C:
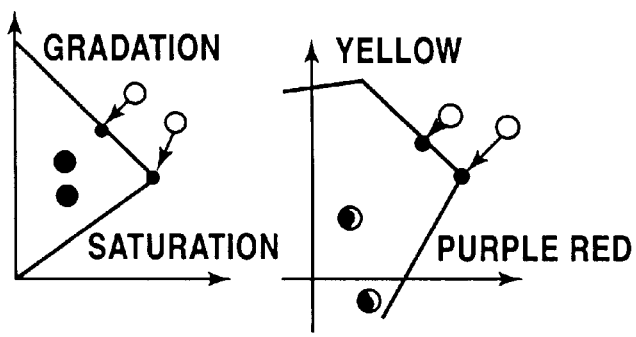
Figure 21:
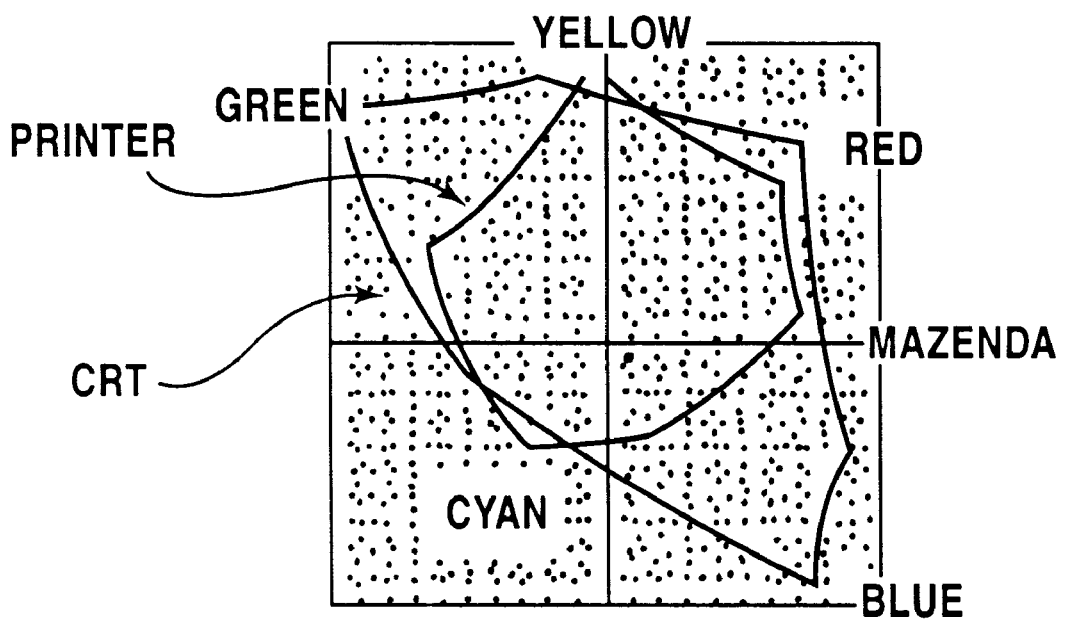
FIG. 21 is a diagram which illustrates problems of a conventional gamut mapping process.

FIGS. 17A and 17B illustrate a process of designating a replacement color in the region converting process shown in FIG. 16.

As shown in FIG. 17A, a color image is displayed on the display unit 12 with a color of the highest saturation at 10 values of lightness L*. The user sees converted colors, and designates, with a mouse, an image area (e.g., the sky) where the gradation is insufficient. As a result, the gradation of the designated image area, i.e., the level of the lightness L*, can be increased. In this manner, any unnatural tendency of the converted colors can freely be improved.

The user is also capable of freely selecting a replacement color. FIG. 17B shows a three-dimensional L*a*b* color space of categorical colors displayed on the display unit 12 which vary depending on the position in the color space. When the user designates a position in the displayed color space with a mouse, a replacement color is selected as the categorical color corresponding to the designated position. The use can thus freely select a desired categorical color.

The present invention may be modified as follows:

In the above embodiments, the CRT display unit is used as the first color image device, and the printer is used as the second color image device. However, other color image devices may be used.

While the L*a*b* color space has been described above, any of various other color spaces such as the L*u*v* color space, the RGB color space, etc. may be used.

The present invention offers the following advantages:

Since each of colors of an input color image which are based on the human color perception is converted for a gamut, colors are prevented from being altered due to the conversion.

Because each of colors of an input color image is converted, a color data reduction ratio for compressing the color data can be increased, and the clearness of the color image will not be lost.

Each of colors of an input color image can accurately be converted into a categorical color using a categorical color classification table. Accordingly, color classification errors are prevented from occurring. The colors can also be converted simply because the categorical color classification table is referred to.

Although certain preferred embodiments of the present invention have been shown and described in detail, it should be understood that various changes and modifications may be made therein without departing from the scope of the appended claims.

What is claimed is:

1. A method of converting first color data contained in a first non-standard and device-dependent color range of a first image device into second color data contained in a second non-standard and device-dependent color range of a second image device, comprising the steps of:

classifying said first color data into a corresponding color data in a device-independent standard color space and a corresponding color defined according to human color perception of said first color data in said device-independent standard color space by referring to a classification table representing the correspondence between colors determined based on said human color perception in said device-independent standard color space and said corresponding color data; and converting said corresponding color data into a standard color data of said second device-dependent color range in said device-independent standard color space with respect to each of the classified colors, and converting said standard color data into said second color data of a second non-standard and device-dependent color range of said second image device.

2. The method of converting of claim 1, wherein said classifying step comprises:

a step of converting said first color data into said corresponding color data of said first color data in said device-independent standard color space; and classifying said corresponding color data into said corresponding color by referring to said first classification table.

3. A method of converting first color data contained in a first color range of a first image device into second color data contained in a second color range of a second image device, comprising the steps of:

classifying said first color data into a corresponding color defined on human color perception of said first color data by referring to a classification table of grid points representing the correspondence between colors determined based on said human color perception and said first color data; and converting said first color data into said second color data by utilizing a corresponding color converting parameter for said second color range defined for each of the classified colors, wherein said step of classifying the first color data comprises the steps of:

converting said first color data into a closest grid point in said first color range; and referring to said classification table storing color codes corresponding respectively to said grid points by said converted grid point.

4. A method according to claim 3, wherein said step of classifying the first color data comprises the steps of:

deciding whether said first color data is a grid point in said color space;

classifying said first color data into a color at the grid point if said first color data is the grid point; and classifying said first color data into a color at another grid point closest to said first color data if said first color data is not the grid point.

5. A method of converting first color data contained in a first color range of a first image device into second color data contained in a second color range of a second image device, comprising the steps of:

classifying said first color data into a corresponding color defined on human color perception of said first color data by referring to a classification table representing the correspondence between colors determined based on said human color perception and said first color data; and converting said first color data into said second color data by utilizing a corresponding color converting parameter for said second color range defined for each of the classified colors, wherein said step of converting the classified color comprises the step of:

converting said first color data into said second color data such that said first color data will be contained in a corresponding color region in the color range of said second image device.

6. A method according to claim 5, wherein said step of converting the classified color comprises the step of:

converting said first color data in the color region in the color range of said first image device uniformly into a reference point in the color region in the color range of said second image device.

7. A method according to claim 6, wherein said step of converting the classified color comprises the step of:

converting said first color data uniformly into a color of lowest saturation in the color region in the color range of said second image device.

8. A method according to claim 5, wherein said step of converting the classified color comprises the steps of:

using said second color data as said first color data if said first color data is in an area where the color region of said first image device and the color region of said second image device overlap each other; and converting said first color data into a color closest thereto in the color region of said second image device if said first color data is in an area where the color region of said first image device and the color region of said second image device do not overlap each other.

9. A method according to claim 5, wherein said step of converting the classified color comprises the step of:
replacing the first color data in the color region in the color range of said first image device with a color in the color region in the color range of said second image device.

10. A method according to claim 9, wherein said step of converting the classified color comprises the step of:
replacing the first color data in the color region in the color range of said first image device with a color of highest saturation in the color region in the color range of said second image device.

11. An apparatus for converting first color data contained in a first non-standard and device-dependent color range of a first image device into second color data contained in a second non-standard and device-dependent color range of a second image device, comprising:
a first classification table representing the correspondence between colors determined based on human color perception in a device-independent standard color space and color data in said device-independent standard color space;
a second classification table for converting a corresponding color data of said first color data in said device-independent standard color space into a corresponding standard color data of said second color data in said device-independent standard color space; and
converting means for converting said first color data into said corresponding color data of said first color data in said device-independent standard color space, classifying said corresponding color data into said corresponding color by referring to said first classification table, and converting said corresponding color data into said standard color data of said device-dependent second color range in said device-independent standard color space with respect to each of the classified colors by using said second classification table, and converting said standard color data into said second color data of a second non-standard and device-dependent color range of said second image device.

12. An apparatus for converting first color data contained in a first color range of a first image device into second color data contained in a second color range of a second image device, comprising:
a classification table representing the correspondence between colors determined based on said human color perception and said first color data; and
converting means for classifying said first color data into a corresponding color defined on human color perception of said first color data by referring to said classification table, and converting said first color data into said second color data by utilizing a corresponding color converting parameter for said second color range defined for each of the classified colors,
wherein said classification table stores data of grid points in a first color space and color codes corresponding respectively to said grid points.

13. An apparatus according to claim 12, wherein said converting means comprises means for classifying said first color data into a color at the grid point if said first color data is the grid point, and classifying said first color data into a color at another grid point closest to said first color data if said first color data is not the grid point.

14. An apparatus for converting first color data contained in a first color range of a first image device into second color data contained in a second color range of a second image device, comprising:
a classification table representing the correspondence between colors determined based on said human color perception and said first color data; and
converting means for classifying said first color data into a corresponding color defined on human color perception of said first color data by referring to said classification table, and converting said first color data into said second color data by utilizing a corresponding color converting parameter for said second color range defined for each of the classified colors,
wherein said converting means comprises means for converting said first color data into said second color data such that said first color data will be contained in a corresponding color region in the color range of said second image device.

15. An apparatus according to claim 14, wherein said converting means comprises means for converting said first color data in the color region in the color range of said first image device uniformly into a reference point in the color region in the color range of said second image device.

16. An apparatus according to claim 15, wherein said converting means comprises means for converting said first color data uniformly into a color of lowest saturation in the color region in the color range of said second image device.

17. An apparatus according to claim 14, wherein said converting means comprises means for using said second color data as said first color data if said first color data is in an area where the color region of said first image device and the color region of said second image device overlap each other, and converting said first color data into a color closest thereto in the color region of said second image device if said first color data is in an area where the color region of said first image device and the color region of said second image device do not overlap each other.

18. An apparatus according to claim 14, wherein said converting means comprises means for replacing the first color data in the color region in the color range of said first image device with a color in the color region in the color range of said second image device.

19. An apparatus according to claim 14, wherein said converting means comprises means for replacing the first color data in the color region in the color range of said first image device with a color of highest saturation in the color region in the color range of said second image device.

* * * * *